United States Patent [19]

Chenel et al.

[11] 4,120,999

[45] Oct. 17, 1978

[54] MULTIPLE PANE WINDOWS WITH IMPROVED SEALS

[75] Inventors: Pierre Chenel, Enghien les Bains; Michel Jean Moncheaux, Chalon sur Saone, both of France

[73] Assignee: Saint-Gobain Industries, Neuilly-sur-Seine, France

[21] Appl. No.: 700,882

[22] Filed: Jun. 29, 1976

[30] Foreign Application Priority Data

Jul. 10, 1975 [FR] France ............................ 75 21646

[51] Int. Cl.[2] ............................ B32B 1/04; E04C 2/34

[52] U.S. Cl. ............................ 428/34; 52/172; 52/790; 156/101; 156/107; 156/109; 156/295; 428/212; 428/419; 428/426; 428/440; 428/441; 428/194

[58] Field of Search ............................ 428/34, 426, 419, 440, 428/441, 212, 105, 109, 113, 114, 194; 156/101, 107, 109, 295; 52/172, 616

[56] References Cited

U.S. PATENT DOCUMENTS

| | | | |
|---|---|---|---|
| 3,473,988 | 10/1969 | Rullier | 156/109 |
| 3,531,346 | 9/1970 | Jameson | 428/34 |
| 3,733,237 | 5/1973 | Wolff | 156/107 |
| 3,791,910 | 2/1974 | Bowser | 428/433 |
| 3,876,489 | 4/1975 | Chenel | 156/566 |

FOREIGN PATENT DOCUMENTS 1,527,165 5/1968 France.

*Primary Examiner*—Ellis Robinson

*Attorney, Agent, or Firm*—Pennie & Edmonds

[57] ABSTRACT

In the production of a multiple pane window, a multiple layer plastic filamentary seal is deposited on the face of a transparent or translucent sheet adjacent the edges thereof over a major portion of the periphery. The seal is deposited by an extrusion nozzle from a starting point to an end point at a corner, by relatively moving and rotating the sheet past the nozzle. At least one layer of the multiple layer seal contains a larger proportion of desiccant material and another layer contains a smaller proportion or no desiccant material. At the starting and/or end points only the layer or layers containing the smaller proportion or no desiccant material is extruded. In a modification, at each corner only the layer or layers containing the smaller proportion or no desiccant material is extruded. A process for applying the seal, a multiple pane window resulting therefrom, and apparatus for applying the seal are described.

6 Claims, 8 Drawing Figures

MULTIPLE PANE WINDOWS WITH IMPROVED SEALS

The present invention relates to the manufacture of multiple pane windows having filamentary seals made of plastic material. More specifically, it relates to a process for applying the filamentary seal to the face of one of the sheets used to form the multiple pane window, apparatus for implementing the process, and a multiple pane window produced by the process or apparatus.

Multiple pane insulating windows comprise two or more sheets of a transparent or translucent material which are separated from one another by intermediate joints or seals. The sheets are generally made of glass, and glass windows will be referred to hereinafter although this does not constitute a limitation of the invention. The interposed joints or seals have a dual function. Firstly, they are designed to seal the inner air spaces situated between the sheets of glass so as to prevent the passage of vapors and dust from the atmosphere, and secondly, they are designed to hold the sheets of glass firmly in place with respect to one another in the desired position and with the requisite spacing. When the interposed joints are made of plastic material, they are formed of an inner seal such as polyisobutylene and an outer mastic seal such as a silicon or polysulfide elastomer. The inner seal usually contains a drying or desiccant material which is designed to absorb the drops of moisture trapped in the air space separating the two sheets of glass. By virtue of its excellent adhesive properties, the outer mastic keeps the component parts in their correct positions and also insures sealtightness. Multiple pane insulating windows of this type are described in U.S. Pat. Nos. 3,791,910 and 3,733,237 as well as in French Pat. No. 1,527,165 issued to the assignee hereof.

It is also known to form the inner seal in two parts, one containing desiccant material and the other without desiccant. This latter part is designed to separate the sheets of glass so as to retain the desired air space between them. A window of this type is described in German Pat. No. 1,054,210.

U.S. application Ser. No. 639,786, filed Dec. 11, 1975 by Pierre Chenel, describes another embodiment of a multiple pane window in which the inner seal contains a desiccant material throughout its entire cross-section and in which the concentration of the desiccant increases between the outer edge and the inner edge of the seal. This may be achieved by means of a double filamentary seal whose outer layer extends to approximately the middle of the thickness of the seal and contains a small proportion of the desiccant, while the inner layer contains a large quantity of desiccant.

Double seals of this type can be placed in position in the manner described in French Pat. No. 2,207,799, issued to the assignee thereof, by simultaneously extruding two layers based on the same plastic material such as polyisobutylene. When it is discharged from the extrusion nozzle, the seal is deposited on a sheet of glass beginning at a corner of the sheet. One side of the sheet is first passed beneath the extrusion nozzle. The sheet is then rotated about 90° and the second side is passed beneath the nozzle. This procedure is repeated until the first corner, at which extrusion was commenced, is again beneath the extrusion nozzle. At this point extrusion is interrupted, the filamentary seal is cut by a suitable device, and the window is conveyed to the subsequent processing station.

After assembly, for example, of two sheets of glass when producing a double pane window, the two ends of the strip are joined together by squeezing so as to produce a sealed continuous barrier over the entire periphery of the window, thereby isolating the air space between the two sheets of glass from the outside atmosphere.

At the point where the two ends of the seal are pinched together, an intermediate zone may be formed consisting of material containing solely or primarily a large proportion of the desiccant and therefore only a small proportion of the plastic sealing material. Consequently this intermediate zone has reduced sealtightness and may impair or prevent complete sealtightness of the inner air space between the two sheets of glass.

In accordance with the invention, a process for applying a multiple layer plastic filamentary seal to a face of a transparent or translucent sheet, at least one layer containing a larger proportion of desiccant material and another layer containing a smaller proportion or no desiccant material, comprises relatively moving and rotating the sheet past an extrusion nozzle to deposit the filamentary seal on said face adjacent the edges thereof from a starting point to an end point at a corner thereof, extruding simultaneously from said nozzle the multiple layers of said filamentary seal over a major portion of the periphery of said face of the sheet, and extruding from the nozzle adjacent said starting and/or end points only the layer or layers containing said smaller proportion or no desiccant material to produce opposed surfaces thereof at said corner. In a modification the process includes extruding from said nozzle at each corner of said face of the sheet only the layer or layers containing said smaller proportion or no desiccant material.

The resulting multiple pane window comprises a pair of transparent or translucent sheets arranged in generally parallel spaced relationship with a filamentary seal between said sheets adjacent the periphery thereof, said window having a plurality of sides and corners and said filamentary seal having a joint at one of said corners, said filamentary seal having a plurality of juxtaposed layers over the major portion of the length thereof, at least one layer containing a larger proportion of desiccant material and another layer containing a smaller proportion or no desiccant material, and said seal at said joint at one of the corners having only the layer or layers containing said smaller proportion or no desiccant material. In a modification the seal at each of said corners has only the layer or layers containing said smaller proportion or no desiccant material.

Apparatus for carrying out the process comprises extrusion means including a single extrusion nozzle and a plurality of channels for supplying plastic sealing material to said nozzle, at least one of said channels supplying plastic material containing a larger proportion of desiccant material and another channel supplying plastic material containing a smaller proporition or no desiccant material, means for advancing a said sheet beneath said nozzle to deposit sealing material on the face of the sheet adjacent an edge thereof and means for successively rotating the sheet in the plane thereof to deposit sealing material along successive edges thereof until the ends of the deposited material approximately meet at a corner of the sheet, and means for controlling said channels of the extrusion means to deposit both material containing said larger proportion and material containing said smaller proportion or no desiccant material to a major portion of the periphery of said face of the sheet and to deposit at one or both ends of the deposited material only material containing said smaller proportion or no desiccant material whereby opposed surfaces thereof approximately meet at said corner. In a modification the apparatus includes means for controlling said channels of the extrusion means to deposit at each corner of said face of the sheet only material containing said smaller proportion or no desiccant material.

Other objects, features and advantages of the present invention will be apparent from the following description thereof, taken in conjunction with the accompanying drawings in which.

Figure 1:
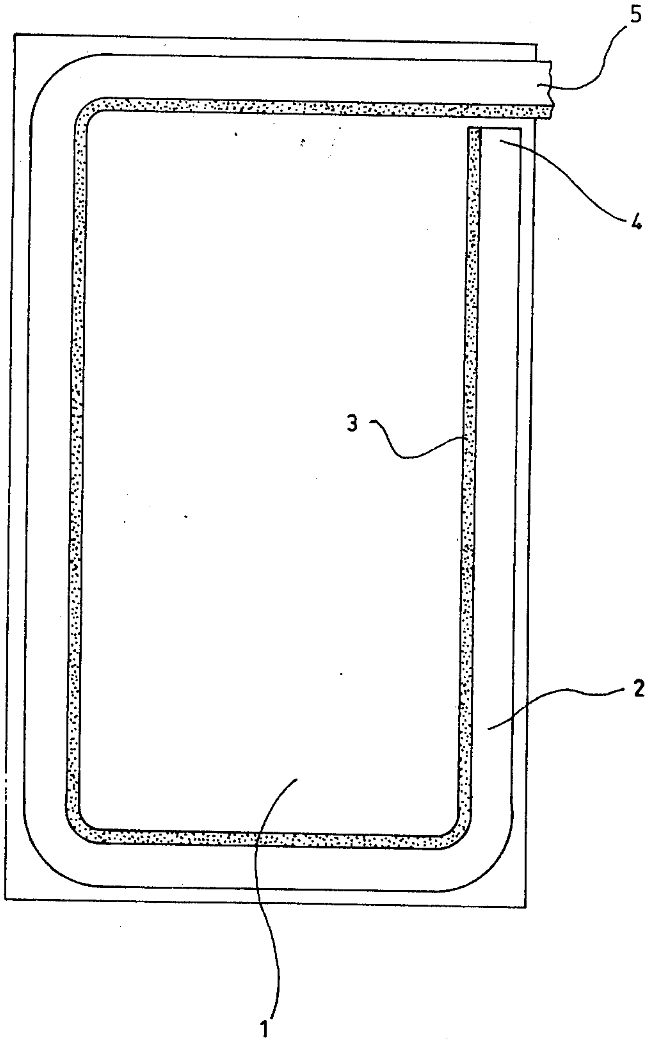
FIG. 1 is a plan view of a sheet of glass on which an inner filamentary seal comprising an inner layer and an outer layer has been deposited by a conventional method.
Figure 2:
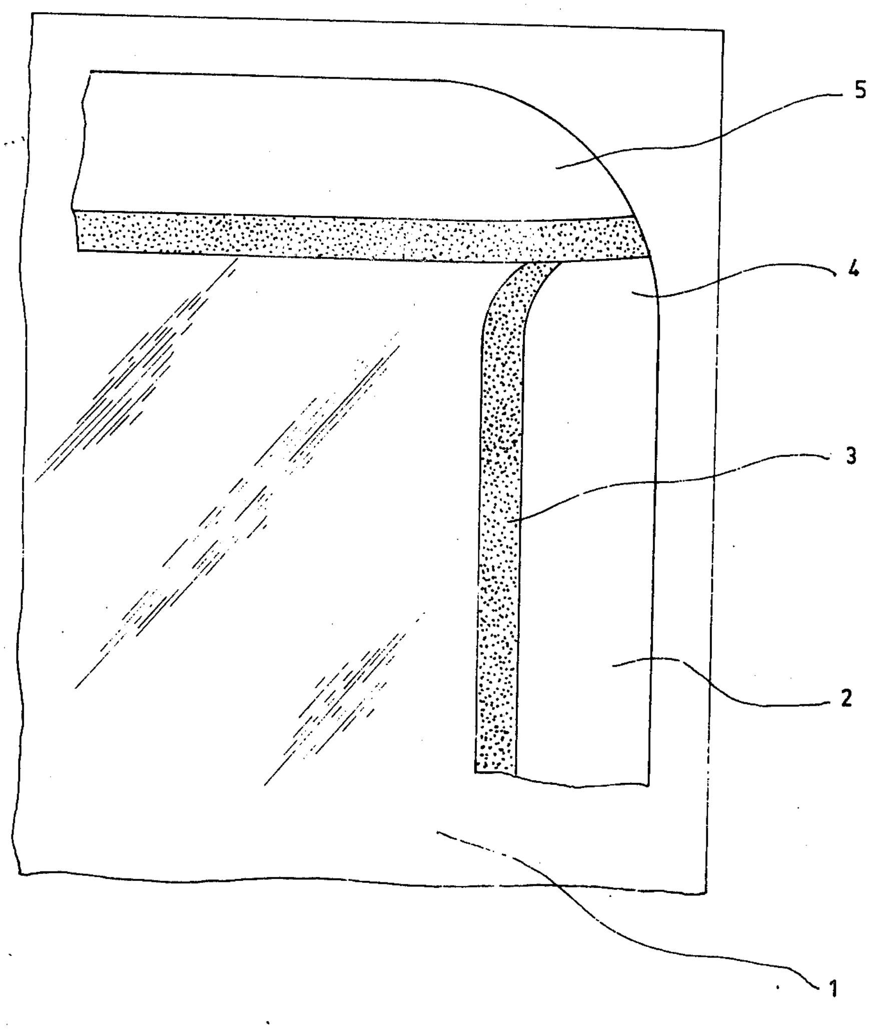
FIG. 2 is a detail of FIG. 1 after the two ends of the seal have been joined together.

FIG. 1 shows a conventional method of depositing on the face of a glass sheet a multiple layer plastic filamentary seal, here shown as having two layers. One layer, here the outer layer 2, generally contains only a small amount of proportion of desiccant material or no desiccant at all. The other layer, here the inner layer 3, generally contains a large proportion of desiccant material. After having deposited the double layer seal on the entire periphery of the window, the two ends 4 and 5 of the seal are joined together, such as by placing a second sheet of glass over the first sheet and squeezing the sheets together. As shown in FIG. 2, it will be noted that, after joining the ends, the inner layer 3 containing a large proportion of desiccant and thus a small proportion of the sealing plastic material is flush with the outer layer 2. Thus the seal is impaired and may fail to provide the desired airtight barrier.

Figure 3:
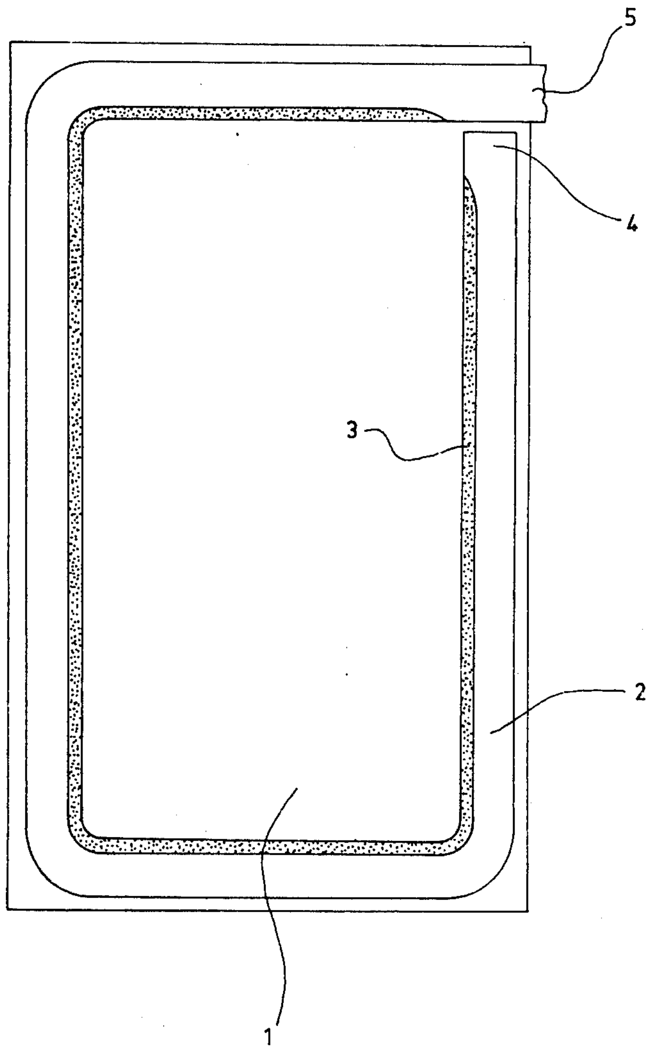
FIG. 3 is a plan view of a sheet of glass, in accordance with the invention, on which a seal comprising an inner layer and an outer layer has been deposited around the entire periphery except that only the outer layer has been deposited in the corner where the seal starts and ends.

As shown in FIG. 3, according to the invention it is proposed to begin depositing on sheet 1 a seal consisting solely of the layer of outer plastic material 2 containing only a small proportion of desiccant material or no desiccant at all, as shown at 5. After having progressed a sufficient distance from the corner of the window, for example approximately 2 centimeters, a complete multiple layer seal is then extruded. As here shown, the multiple layer seal has the outer layer 2 and the inner layer 3. This double layer seal is deposited over the entire periphery of the window up to within approximately 2 centimeters of the corner in which deposition was started. Extrusion of the inner layer 3 is then interrupted. Thus the inner layer rapidly grows smaller until it no longer exists, and only the outer layer 2 continues to be extruded, as shown at 4. When the end point 4 of the seal is sufficiently close to the starting point 5, extrusion of the outer layer 2 is also interrupted and the seal is cut. A second sheet of glass is then applied to the first and the two sheets squeezed together, the seal then adhering sufficiently to the two sheets so as to hold them together during the subsequent processes.

Figure 4:
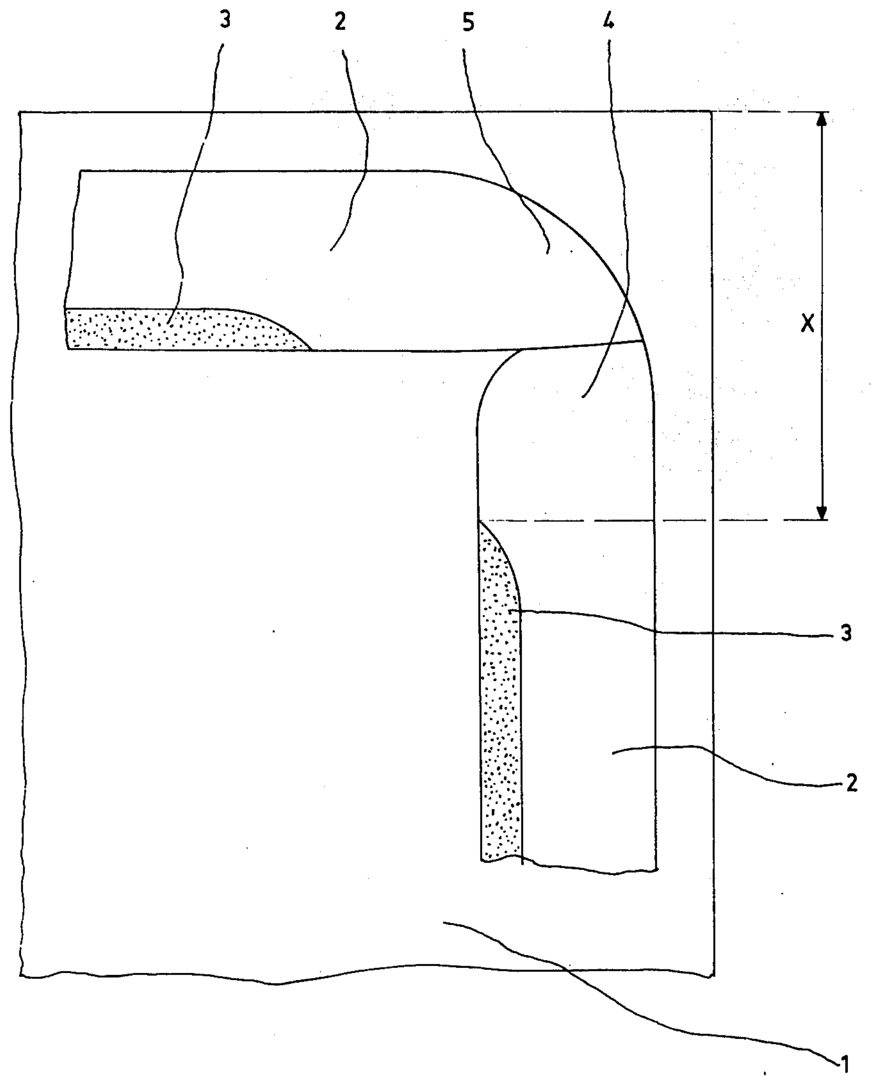
FIG. 4 is a detail of FIG. 3 after the two ends of the seal have been joined together.

The two ends 4 and 5 of the strip become joined together by the squeezing, as shown in FIG. 4. At the corner the seal consists solely of sealing material containing only a small proportion of desiccant or no desiccant at all. Thus the seal at the corner is strong, and affords the same degree of seal-tightness as the remainder of the seal.

In the embodiment of FIGS. 3 and 4, only layer 2 is extruded at both the starting and end points, and produces opposed surfaces of the layer containing a small proportion or no desiccant material. Depending on the exact starting and end points, extrusion of only layer 2 at either the starting or the end points may suffice to produce opposed surfaces of plastic sealing material containing little or no desiccant, although the procedure illustrated is preferred. If more than two layers are employed, the extrusion of the several layers may be appropriately controlled to give the above-described result at the corner.

Figure 5:
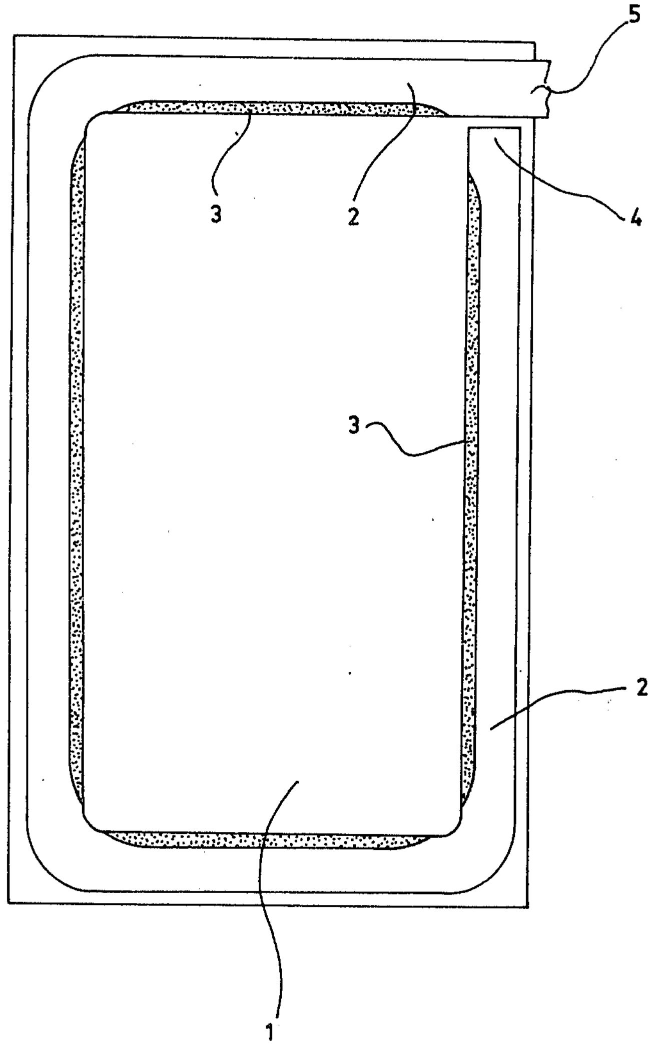
FIG. 5 is a plan view similar to FIG. 3 in which only the outer layer has been deposited in the four corners.

According to a modification of the procedure, as shown in FIG. 5, the inner layer 3 containing a large quantity of desiccant is interrupted at each of the four corners of the window. Thus, starting with the first corner, extrusion of the inner layer 3 is only begun after that of the outer layer 2 when the sheet of glass has advanced a few centimeters with respect to the extrusion nozzle. A double layer seal is deposited over almost the entire length of the first side of the sheet 1, but extrusion of the inner layer 3 is interrupted within a few centimeters of the end of the first side, the outer layer 2 continuing to be deposited right up to the next corner of the sheet. At the corner, extrusion of the outer layer is also interrupted and the sheet is rotated about 90° so that its next side comes beneath the extrusion nozzle. Extrusion of the outer layer is then resumed, and after a few centimeters delay extrusion of the inner layer is resumed. The same procedure is repeated at the following corner and so on. By depositing at each corner only the layer containing little or no desiccant, strong seals are obtained despite discontinuities which may exist at the corners.

Figure 6:
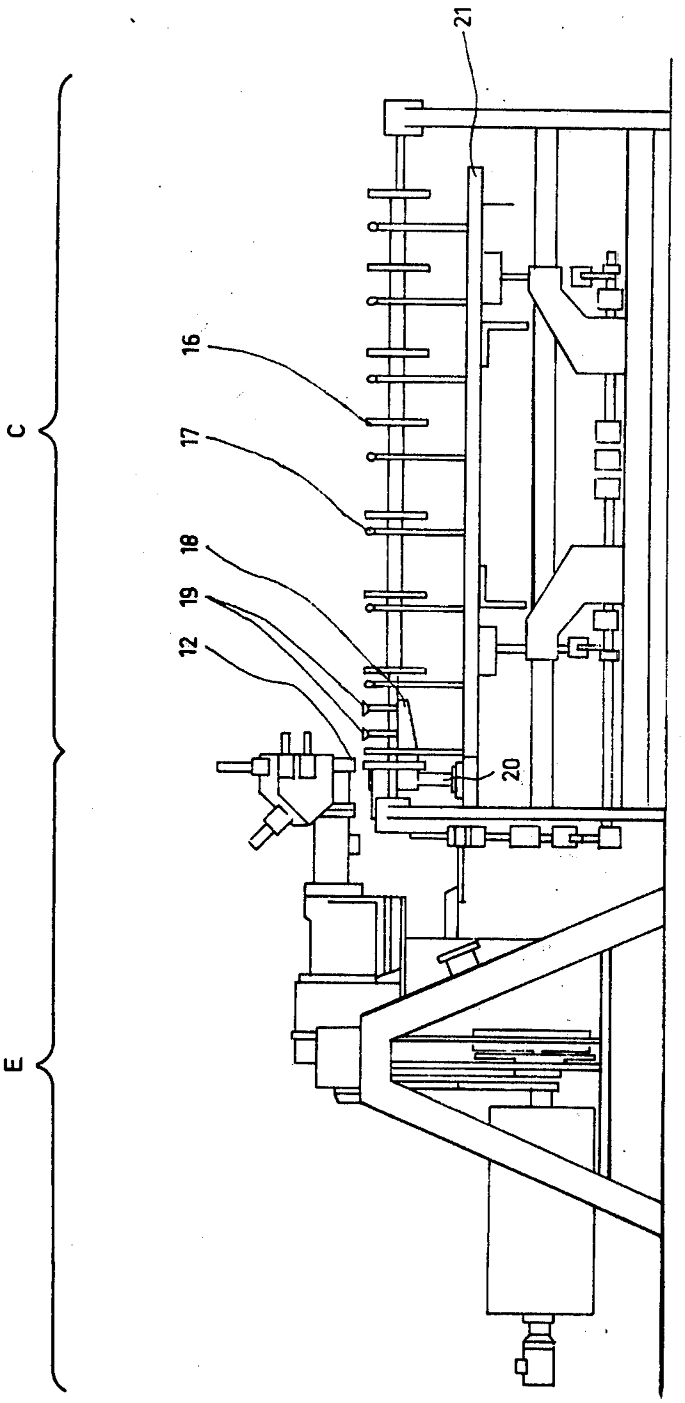
FIG. 6 is an elevation of apparatus suitable for applying a seal in accordance with the invention.
Figure 7:
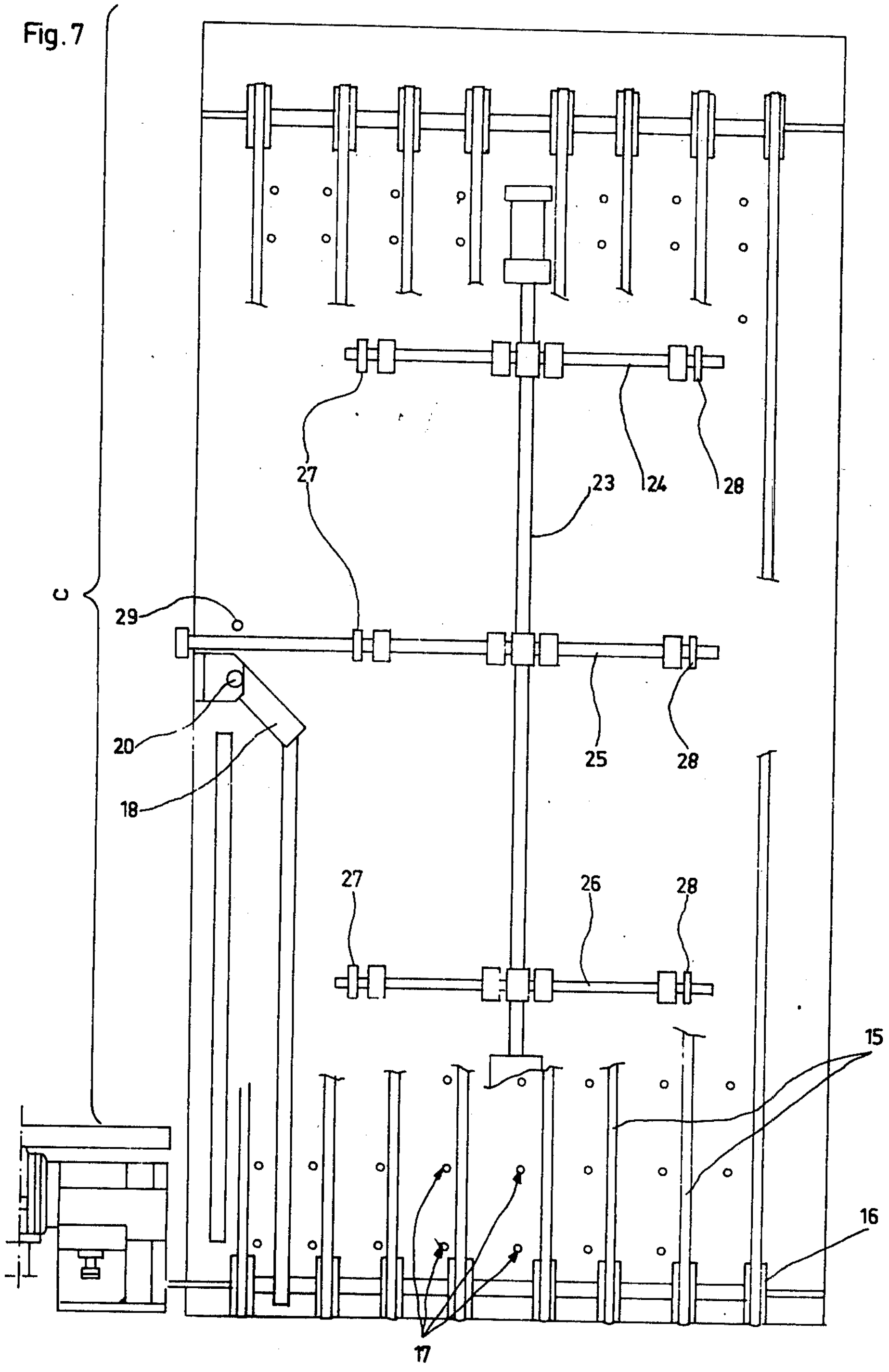
FIG. 7 is a schematic plan view of the apparatus of FIG. 6.
Figure 8:
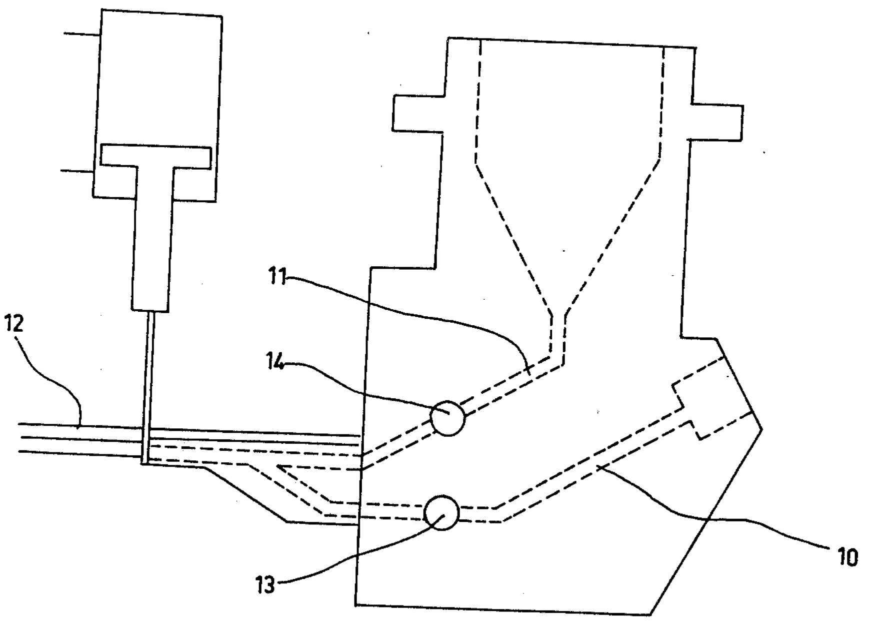
FIG. 8 is a diagrammatic illustration of extrusion means for use in the apparatus of FIG. 6.

FIGS. 6–8 show apparatus for depositing a multilayer seal in accordance with the invention, by interrupting the extrusion of a layer in at least one corner of the window. The apparatus includes extrusion means E which, as shown in FIG. 8, includes two supplies of extrusion material connected by conduits or channels 10 and 11 to a single extrusion nozzle 12 capable of producing a sealing strip comprising multiple juxtaposed layers. Known devices, which are described in detail in the aforementioned French Pat. No. 2,207,799 and which are represented at 13 and 14, act separately on each of the conduits 10 and 11 and are capable of blocking each of the conduits and producing a low pressure zone therein, thereby interrupting extrusion of the plastic material being delivered via the blocked conduit.

Support and advancement means for the sheet of glass are provided which cause it to be advanced beneath the nozzle 12 and rotated so that each of its sides is successively moved beneath the nozzle. A conveyor C includes horizontal belts 15 carried by pulleys 16 for advancing a sheet of glass beneath the nozzle 12.

A system of spherical rollers 17 is mounted on a table 21 which is below the belts. Means for rotating a sheet of glass on its plane comprises an arm 18 equipped with suction cups 19 and rotatably mounted on a support for rotation about axle 20 so as to support the sheet of glass and rotate it through 90°. The rollers 17 and the rotating mechanism are retracted into a lower position with respect to the belts 15 of the conveyor when they are not in operation, and are supported by a single vertically adjustable table 21 which is adapted to be raised under the action of a jack 22 through the intermediary of rods 23, 24, 25, 26 acting on cams 27 and 28, thereby bringing the rollers 17 and the rotating mechanism into operating position.

Detecting means 29 detects the passage of the edges of a sheet of glass and controls the stopping and starting of conveyor C, the vertical movements of table 21, the rotation of arm 18, and the starting and interruption of extrusion of one and/or the other of the layers of the seal by control of the extrusion means E. The detection means can consist of a single photoelectric cell disposed upstream of the nozzle 12 (located above the pivot axis 20 of arm 18) at a slightly greater distance than the distance separating the end of the sheet of glass from the beginning of the inner strip 3. This distance bears the reference X in FIG. 4. The cell reacts to the passage of an edge of the sheet of glass and triggers the different actions described above with delays which may be regulated by conventional timing systems.

In operation, the sheet of glass is delivered from an upstream processing station on the belts 15 of the conveyor. When the leading edge of the sheet intercepts the optical axis of the detector 29, the advancement of the sheet continues and the detector 29 triggers, after a regulatable delay $t\mathbf{1}$, extrusion of the outer layer 2 containing a small proportion of desiccant or no desiccant. After another delay $t\mathbf{2}$, which is also regulatable and longer than $t\mathbf{1}$ such that during the time $(t\mathbf{2}-t\mathbf{1})$ the sheet has covered a distance on the order of 2 centimeters, extrusion of the inner layer 3 containing a large quantity of desiccant begins. As the sheet is displaced in this manner beneath the nozzle, initially the outer layer 2 and then both layers 2,3 are deposited.

When the trailing edge of the sheet intercepts the optical axis of the detector 29 two alternative operations can occur, depending on whether this is the embodiment of FIG. 3 having a single layer only at the corner of the window at which extrusion is commenced and terminated, or the embodiment of FIG. 5 having a single layer in each of the four corners.

In the case of FIG. 3, both layers are deposited at the second and third corners. Upon passage of the trailing edge of the sheet, the detector causes extrusion of the two layers to be interrupted and halts movement of the sheet of glass. The sheet of glass is then rotated and after it has been rotated and is resting once more on the belts 15 of the conveyor, simultaneous extrusion of the two layers is resumed.

In contrast, in the case of the embodiment of FIG. 5, upon passage of the trailing edge of the sheet of glass, the detector triggers the following operations. After a delay $t\mathbf{3}$, extrusion of the inner layer 3 is interrupted. After a delay $t\mathbf{4}$, such that $t\mathbf{4}-t\mathbf{3} = t\mathbf{2}-t\mathbf{1}$, extrusion of the outer layer 2 and movement of the sheet of glass are interrupted. Then the operations for rotating the sheet of glass take place. After the sheet has been rotated, extrusion of the outer layer 2 and advancement of the sheet of glass resume and, after a delay $t\mathbf{4}-t\mathbf{3} = t\mathbf{2}-t\mathbf{1}$, extrusion of the inner layer 3 resumes. The same procedure is repeated in the case of the following two corners.

In the case of the last corner (which is also the first corner), the order of the successive extrusion interruptions is the same as in the case of the second and third corners in the embodiment of FIG. 5.

Apparatus in which the detection means consists of a plurality of photoelectric cells, each controlling one or more different actions, may also be employed if desired. In this case, when the cells are located upstream of the nozzle, they are disposed at a distance from the nozzle which is at least equal to the distance separating the position on the sheet of glass where they are triggered from the trailing edge of the sheet of glass.

Apparatus similar to that shown in FIGS. 6 and 7, except for the control of the extrusion means described above, is shown in U.S. Pat. No. 3,876,489 and in U.S. patent application Ser. No. 639,788 filed Dec. 11, 1975 by Chenel et al. and assigned to the assignee hereof. Reference may be made thereto for further details, if necessary. The outer plastic seal layer includes between 0 to 20% by weight of desiccant material. On the other hand, an inner plastic seal layer may have about 25% to 80% by weight of desiccant material. Also, the thickness of the inner layer can be about 0.1 and 1.5 mm over the major length of the filamentary seal.

We claim:

1. A multiple pane window comprising a pair of transparent or translucent sheets arranged in generally parallel spaced relationship with a filamentary seal between said sheets adjacent the periphery thereof, said window having a plurality of sides and corners and said filamentary seal having a joint at one of said corners, said filamentary seal having a plurality of juxtaposed layers over the major portion of the length thereof, at least one layer containing a larger proportion of desiccant material and at least another layer containing a smaller proportion or no desiccant material, and said seal at said joint at one of the corners having only the layer or layers containing said smaller proportion or no desiccant material abutting each other.

2. A multiple pane window according to claim 1 in which said seal at each of said corners has only the layer or layers containing said smaller proportion or no desiccant material.

3. A multiple pane window according to claim 1 in which said plurality of layers consists of an inner layer containing said larger proportion of desiccant material and an outer layer containing said smaller proportion or no desiccant material.

4. A multiple pane window according to claim 3 in which said outer layer has between 0 and 20% by weight of desiccant material.

5. A multiple pane window according to claim 4 in which said inner layer has between 25% and 80% by weight of desiccant material.

6. A multiple pane window according to claim 3 in which the thickness of said inner layer is between 0.1 and 1.5 millimeters over the major portion of the length of the filamentary seal.

* * * * *